March 23, 1954 O. A. ERICSSON 2,673,249

MAGNETIC RECORDING AND REPRODUCING DEVICE

Filed Jan. 24, 1952

INVENTOR
OSCAR AUGUST ERICSSON
BY [signature]
ATTORNEY

Patented Mar. 23, 1954

2,673,249

UNITED STATES PATENT OFFICE 2,673,249

MAGNETIC RECORDING AND REPRODUCING DEVICE

Oscar August Ericsson, Hagersten, Sweden, assignor to Telefonaktiebolaget L M Ericsson, Stockholm, Sweden, a Swedish company Application January 24, 1952, Serial No. 268,020

8 Claims. (Cl. 179—100.2)

Figures 1, 2, 3:
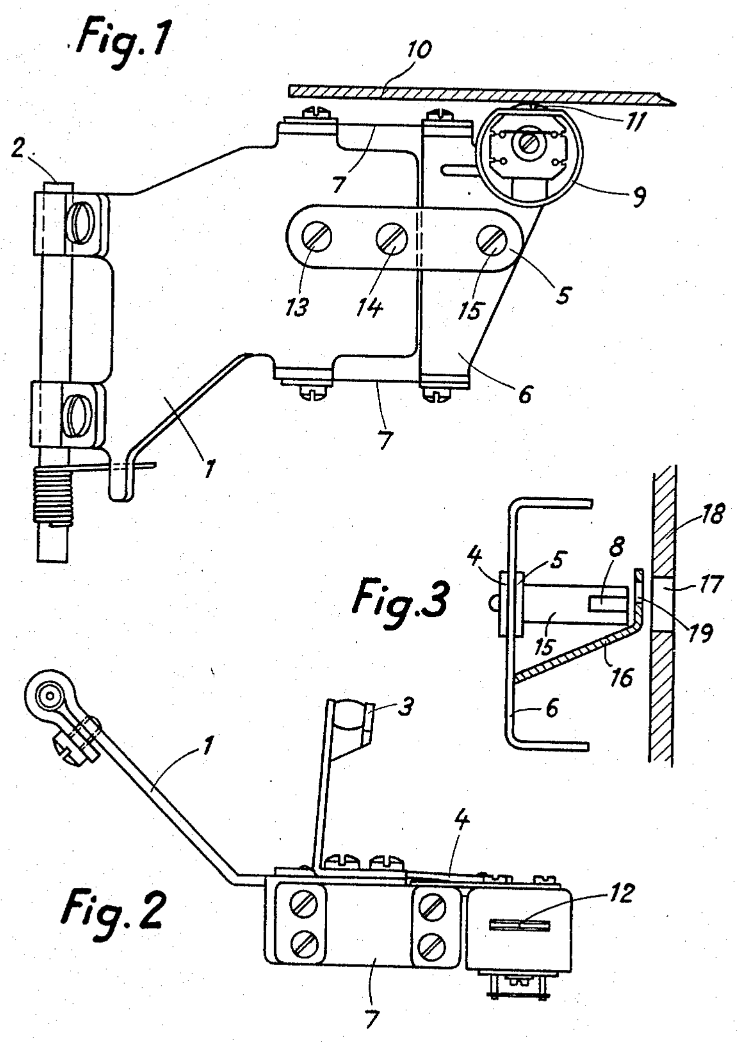

The present invention relates to magnetic recording devices in which a magnetic head resting against a magnetic sound carrier is used for sound recording and reproducing.

In previously known devices of this kind for sound recording the magnetic recording and reproducing head rests against the sound carrier with a definite constant pressure, which causes that both the head and the sound carrier are subjected to an excessive wear, whereby these two devices will be worn rather quickly during the work of the device. This is not allowable in such cases when the recording details cannot or ought not to be exchanged comfortably, for instance in recording devices intended for telephone subscribers. Such devices should have an especially long life time and have preferably the magnetic sound carrier shaped as a disc or a cylinder covered with a very thin layer containing the magnetic material. This layer should be protected against external influence, and therefore the disc or the cylinder should not be accessible to the subscriber. By taking especial measures the head as well as the magnetic layer is evidently to be protected from too strong a wear if their life time shall be sufficient, because of the mutual friction between them during the recording and the reproducing.

In a magnetic sound recording apparatus of this kind the pole shoes of the recording and reproducing head, which shoes have a contact surface with a size of some square millimetres and consist of a soft magnetic material, rest against a surface of a magnetic foil containing a hard magnetic material, for instance iron oxide. The surface of the foil is very large compared with the contact surface of the head, and therefore the head itself will be worn down more quickly than the foil, especially as it consists of a material having a rather low wearing resistance. It is obviously necessary—to satisfy great demands on the life time of the recording details within a sound recording device—to hold the pressure of the head against the sound carrier as low as possible and this involves especial difficulties with regard to manufacture and assembly of the apparatus, as for practical reasons it is not suitable to let this pressure come beyond a definite value.

In a magnetic sound recording device according to the invention the necessary life time of the recording details is achieved in such a way that the magnetic head is so fixed to its recording arm that its pressure against the sound carrier will decrease when the head is worn down by the wear against the magnetic foil, when the device is used. The magnetic head is thereby suitably fixed to the recording arm by means of springs, which cause the contact thrust between the head and the sound carrier. These springs are initially deflected by a distance which is approximately equal to the wearing down allowable for the head whereby the contact thrust of the head against the foil will decrease successively approaching zero asymptotically, when the head has been worn down so much as corresponds to the allowable wear.

As said springs have a definite initial stress and are rather weak, they can easily be damaged so that said stress is altered and the desired pressure will not be attained at the contact with the head. The invention also relates to devices preventing such damages. For this reason the sound recording device includes an especial clamping device intended to protect said springs against external influence during transport or the like. The magnetic head is placed on a holder, which by means of the springs is movably arranged on the recording arm, whereby the wall thickness of the recording arm is greater than that of the holder. On each side of the recording arm and the holder there are two side plates of resilient material which are fixed to each other and to the holder and the recording arm by means of screws. When the screw fixed to the holder is not wholly tightened, said movement between the holder and the recording arm can take place but when last mentioned screw is completely tightened the holder is arranged to be tightly squeezed between the side plates without being moved sideways in relation to the recording arm, whereby said movement of the holder is prevented.

The device according to the invention will be described more closely in the following in connection with an embodiment of the recording details of a magnetic sound recording device shown on the attached drawing, whereby Fig. 1 shows a side view of said details. Fig. 2 shows the magnetic head and the devices carrying the same seen from above and Fig. 3 shows a part of the clamping device.

In Fig. 1, 10 indicates a sound carrier consisting of a solid disc, on the bottom side of which a magnetic foil is attached, for instance cemented. A magnetic recording and reproducing head 9 rests with its pole shoes 11 against the magnetic foil during the recording and reproducing. The slit between the pole shoes is indicated with 12 in Fig. 2. The head 9 is arranged on a holder 6, which in its turn is attached to a recording arm 1 being radially movable in relation to the disc 10. The recording arm performs during the recording and the reproducing an angular motion turning round the shaft 2, suitably from the centre of the rotating disc 10 towards its periphery. The guide roller indicated with 3 in Fig. 2 is intended to control the movement of the recording arm during the work of the apparatus but has nothing to do with the present invention.

The holder 6 is attached to the recording arm 1 by means of two leaf springs 7, which allow a definite limited movement of the holder in relation to the recording arm in direction upwards and downwards in Fig. 1. The springs 7 have a certain initial stress, which tends to press the head 9 upwards against the disc 10 with a rather insignificant force. This stress is so chosen, that the head, before having been worn and when not resting against a disc, will occupy such a position that owing to the spring action it is displaced upwards approximately as much as the maximum wear allowed for the head in fulfilling its purpose as a device for magnetically recording a communication on the magnetic foil of the disc resp. reproducing a communication recorded on this foil. As is mentioned above the head will be worn down successively during the recording and the reproducing, so that its surface which at the beginning is rather small and directed towards the disc will be increased and the head is dimensioned in such a way that such a wear can be permitted to a certain extent without its work being deteriorated. As the initial stress has been chosen so that it decreases with the wear the contact thrust between the head and the foil will obviously also decrease and this pressure approaches zero, when the maximally permitted wearing down for the head is reached. Due to the fact that this pressure is going asymptotically towards zero the wear will take place more slowly as one approaches to the maximally permitted wear down and the life time of the head will therefore increase considerably compared with such sound recording devices, in which for instance a constant thrust exists which acts because of the weight of the magnetic head.

It is evident that the reason for a contact thrust, which of course already at the beginning has been chosen as low as possible to be permitted to decrease still more when the head is worn down, is that the contact thrust in itself is utilized only to hold the head at one and the same distance from or in contact with the magnetic layer of the magnetizable foil. That such a distance is held constant or that such a contact always exists is of course of great importance, because otherwise the magnetic field from the head would not be able to penetrate into the foil only in dependence of the field strength corresponding to the recording but also would depend on variations in the "air gap" between the both adjacent devices caused by possible unevennesses in their surfaces. It is obvious that the necessary contact thrust must be greater when the foil and the head are new, than when these have been utilized within the recording device for a rather long time. The mutual friction between the two devices during the recording and the reproducing procedure will gradually smooth all unevennesses as time goes on, so that the contact surfaces between the foil and the head gradually will be mirror-like which demands a smaller contact thrust for maintaining a constant distance or air gap between the head and the magnetic layer.

As mentioned previously it is necessary in a device according to the invention, where the springs 7 carrying the head, in the manufacture get certain initial stresses, to prevent these stresses from being altered due to careless handling for instance during transport and assembly of the apparatus. For this purpose there are arranged oblong side plates 4, 5 on each side of the holder 6 and the recording arm 1, which plates are made of elastical material and attached to each other by means of screws 13, 14 and 15, which pass through the recording arm resp. the holder. The screws 13 and 14 are tightened in threads in the recording arm 1, while the screw 15 is extended through the holder 6 by means of a hole having a greater diameter than the screw or through an upwardly directed slot in this holder. When the screw 15 is not tightened it allows a certain relative movement upwards and downwards in Fig. 1 between the holder and the recording arm. Upon tightening of this screw the holder 6 will be squeezed between the side plates 4, 5 without being brought sideways (in perpendicular direction in Fig. 2) which could destroy the springs 7. The holder will thus through the tightening of the screw 15 be fixed in relation to the recording arm 1, and is carried by the same, whereby the springs 7 will be relieved of all stresses and vibrations, which could arise for instance during transport of the sound recording device.

The recording details of a sound recording device of that kind to which the invention relates, should, as is mentioned previously, not be accessible from outside. They are enclosed in a casing 18, which is provided with a hole 17 permitting operation of the clamping screw 15 from the outside. It is important that the clamping means not only hold the head fixed on the recording arm 1 but also that the head does not rest against the sound carrier 10. Such a device for guarantying that the head is held pressed down at the clamping is shown in Fig. 3. The holder 6 is as in Figs. 1 and 2 provided with the side plates 4 and 5, which can be pressed against the holder by tightening the screw 15. This screw is, which does not appear from Figs. 1 and 2, lengthened in the direction of the casing 18 of the recording apparatus and provided with a hexagon recess 8 straight in front of hole 17 in the casing. Through this hole a hexagon spanner is inserted from out of the casing for tightening of the screw 15. To enable this to take place a hole should be set in front of the recess 8. This hole is shaped in a lap 16 being firmly bent with the holder 6 and may be brought downwards by means of the spanner from outside the casing until it is set in the indicated manner, so that the hexagon spanner can be put into the recess 8. Then the holder 6 will be brought downwards, and therefore the contact of the head with the sound carrier ceases. It is obvious that clamping of the head is impossible by means of the lap 16 and excluded from contact with the magnetic foil.

The device according to the invention can of course with regard to its detail embodiment be modified in different ways without departing from the scope of the invention. Thus the invention without alteration can be applied to sound carriers built in another way, for instance with discs of magnetic material.

I claim:

1. In a magnetic apparatus for recording signals on and reproducing from a magnetized signal carrier by means of a sound head supported on a recording arm and abutting against said signal carrier, the said carrier having a contact surface of greater resistance to wear than the surface of the sound head abutting against the signal carrier, elastic means disposed between said sound head and the recording arm and holding the sound head in pressure contact with the carrier surface, the said elastic means being preloaded to an extent approximately equal to a predetermined wear of the sound head whereby the initial contact pressure decreases gradually toward a zero value as the wear experienced by the sound head during operation reaches the said predetermined value.

2. In a magnetic apparatus for recording signals on and reproducing from a magnetized signal carrier by means of a sound head supported on a recording arm and abutting against said signal carrier, the said carirer having a contact surface of greater resistance to wear than the surface of the sound head abutting against the signal carrier, spring means supporting the sound head on the recording arm, the said spring means providing for a displacement of the sound head transversely to the recording arm and being preloaded to an extent approximately equal to a predetermined wear of the sound head whereby the initial contact pressure decreases gradually toward a zero value as the wear experienced by the sound head during operation reaches the said predetermined value.

3. An apparatus according to claim 2, wherein the said spring means comprise leaf springs.

4. A magnetic apparatus for recording signals on and reproducing from a magnetizable signal carrier by means of a sound head abutting against said signal carrier, the said signal carrier having a surface of greater resistance to wear than the surface of the sound head abutting against the signal carrier, the said apparatus comprising a recording arm, a holder supporting the sound head, elastic support means supporting the holder on the recording arm in a position in which the sound head is in pressure contact with the surface of the signal carrier, the said elastic support means being preloaded to an extent approximately equal to a predetermined wear of the sound head whereby the initial contact pressure decreases gradually toward a zero value as the wear experienced by the sound head during operation reaches the said predetermined value.

5. A magnetic apparatus for recording signals on and reproducing from a magnetizable signal carrier by means of a sound head abutting against said signal carrier, the said signal carrier having a surface of greater resistance to wear than the surface of the sound head abutting against the signal carrier, the said apparatus comprising a recording arm, a holder supporting the sound head, spring means between the recording arm and the holder supporting the latter in a position providing for displacement of the holder with the sound head transversely to the recording arm and pressing the sound head against the surface of the signal carrier, the said spring means being preloaded to an extent approximately equal to a predetermined wear of the sound head whereby the initial contact pressure between the sound head and the signal carrier decreases gradually toward a zero value as the wear experienced by the sound head during operation reaches the said predetermined value, and clamping means for securing the holder in a fixed position relative to the recording head, the said clamping means comprising at least one clamping member bridging the holder and the recording arm and fixedly secured to one of the two last mentioned components and fastening means for securing the clamping member to the other one of the said last mentioned components.

6. The modification of the magnetic apparatus according to claim 5 in which the said clamping means comprise two elastic clamping members disposed on opposite sides of the holder and the recording arm for securing the holder and the recording arm between said clamping members.

7. An apparatus according to claim 5, wherein the said fastening means comprise a locking means extending with play through the respective component for permitting a limited movement of the holder with the sound head relative to the recording arm, and means coacting with the locking means for tightening said latter means so as to retain the holder with the sound head in a fixed position relative to the recording arm.

8. An apparatus according to claim 7, wherein the said locking means are positioned so as to force said holder into a position in which said sound head is disengaged from the signal carrier upon a tightening of the locking means.

OSCAR AUGUST ERICSSON.

References Cited in the file of this patent

UNITED STATES PATENTS

| Number | Name | Date |
|---|---|---|
| 2,535,480 | Begun | Dec. 26, 1950 |